United States Patent Office 3,404,099
Patented Oct. 1, 1968

3,404,099
PROCESS FOR THE PREPARATION OF IRON-BASE CATALYTIC MASSES AND THE RESULTING PRODUCTS
Andre Steinmetz, Aubervilliers, France, assignor to Produits Chimiques Pechiney-Saint-Gobain, Paris, France
No Drawing. Filed Feb. 2, 1965, Ser. No. 429,901
Claims priority, application France, Feb. 5, 1964, 962,728
24 Claims. (Cl. 252—459)

ABSTRACT OF THE DISCLOSURE

Catalyst compositions for various uses (such as preparing ammonia and chlorine from ammonium chloride, and synthesizing ammonia from hydrogen and nitrogen) are prepared by precipitating a compound such as iron oxide, iron hydroxide, and iron oxychloride by ionic reaction of gaseous oxygen on a readily hydrolyzable, water soluble iron compound, from aqueous solution containing additional iron, onto a support of inert particles suspended in the aqueous solution, filtering off the precipitate, calcining it, and partly reducing it. Typical catalysts consist of particles of carrier, such as silica, alumina, cupric oxide, and silico-aluminates, bearing and united to partly reduced iron oxide, the weight of iron expressed as $Fe_2O_3$ to the weight of the carrier in the composition lying between about 0.5 and 2.

---

This invention relates to a process for the preparation of iron-base catalytic masses and the resulting products. More particularly it relates to such a process in which a difficultly soluble iron product is deposited on a particulate support material from an aqueous bath containing, besides the support material, an agent capable of causing an ionic chemical reaction and at least one material selected from the class consisting of iron salts and metallic iron. The products of this invention are adapted to be used industrially in various catalytic processes, notably in the preparation of ammonia and gaseous chlorine from ammonium chloride and in the synthesis of ammonia from hydrogen and nitrogen.

It has already been known to prepare catalytic masses industrially with an iron-base by a simple association of the active substances among themselves or with a support constituted of an inert substance, this association being carried out currently by mixture or by impregnation of solid particles from solutions of iron compounds.

The applicant has now discovered a process of preparation of iron-base catalytic masses which, compared to the catalytic masses prepared according to known methods, presents an activity and physical properties sensibly superior.

An object of the invention is to prepare catalysts for reactions involving the production of ammonia and chlorine from ammonium chloride, and to prepare them in more efficient, more durable, and superior physical form. Another object is to prepare such catalysts with superior penetrability whereby all parts become more accessible to the reactants, and thereby to improve the efficiency of the processes of producing ammonia and chlorine from ammonium chloride. Other objects will appear as the description proceeds.

Other objects are a process for preparation of iron-base catalytic masses which consists in forming in the presence of an agent capable of causing an ionic reaction such as, for example, oxidation, double decomposition, neutralization or hydrolysis, a slightly soluble iron compound, and to deposit it on the particles serving as a support from an aqueous bath containing, besides the support material and the said agent, at least one ferric material, such as a salt of iron or metallic iron itself.

According to a preferred method of operation, a catalytic mass is prepared by depositing ferric hydroxide or oxide on the support particles from an aqueous solution of a ferric salt containing in suspension the said support particles, and, in addition, metallic iron and an oxidizing agent.

According to another variation of the process, a catalytic mass is prepared from an aqueous solution of an easily hydrolyzable iron compound containing in suspension the support particles by hydrolysis of the iron compound dissolved in the bath and deposition of the iron compound formed, such as an oxide or hydroxide or oxychloride of iron on the support particles.

Finally, one may introduce in the catalytic mass an inert solid diluent such as silica, as well as other substances having catalytic activity, such as compounds of the alkaline metals or catalytic promoters such as compounds of copper, nickel, cobalt, aluminum, and metals of the rare earth group.

The catalytic mass so obtained is dehydrated after deposit on the support particles or after the introduction in the said mass of at least one of the other said constituents.

The iron compounds which are deposited on the support particles are chosen by preference from the oxides, the hydroxides or the oxychlorides of iron, or from compounds susceptible of being transformed easily into the oxide or chloride, or oxychloride of iron, or, further, from the compounds of iron susceptible of being easily reduced to a lower valence. Preferably, the solid particles serving as support are chosen from substances which are inert in the conditions of preparation of the catalyst, and the dimensions of support particles are chosen generally in the range 5 to 100 microns. The support material can be constituted of silica, alumina or silico-aluminates.

It is equally possible to choose the support particles from among substances having an activity as catalyst promoters, said substances being difficultly soluble in the conditions of preparation of the catalyst or among compounds susceptible of being transformed into substances having activity as catalyst promoters by further treatment. According to this variation, one can, for example, use cupric oxide as the support material.

Preferably, one may employ a quantity of support particles such that the ratio by weight of iron expressed as $Fe_2O_3$ to the support particles is in the range 0.5 to 2.

The catalytic masses prepared according to this invention can be used directly in catalytic processes or after further treatment by a well known method, such as a physical treatment like tabletting or granulation, the said physical treatment being combined, if desired, with chemical treatment, such as a partial or total reduction of the iron compounds. In the preparation according to the invention of catalytic masses applicable in the preparation of ammonia or of chlorine from ammonium chloride, one may introduce a salt of an alkaline metal such as potassium chloride, or a salt of copper such as cuprous chloride, as the applicant has described in his French Patent No. 1,332,727, filed June 8, 1962 and being entitled "Process for the Preparation of Gaseous Ammonia and Gaseous Chlorine from Ammonium Chloride" as well as in his patent application No. 953,930 of Nov. 15, 1963 as a certificate of addition to said French Patent No. 1,332,727.

In the preparation, according to this invention of catalysts applicable to the preparation of ammonia from nitrogen and hydrogen, one may further introduce activators such as compounds of potassium or nickel.

The catalysts prepared according to the invention present several advantages in comparison with the catalysts prepared according to the prior art. They have an activity that is both longer-lasting and more intense because of the homogeneous distribution of the active elements in the catalytic mass.

Furthermore, the excellent adherence of the active materials to the support material considerably reduces the formation of entrainable dust by the reactants.

It has further been found that catalytic masses prepared as described above possess particularly favorable properties when one uses, as a support material, silico-aluminates, such as asbestos, vermiculite, biotite, and hydrobiotite. With respect to the support material, asbestos may be used either in the form of powder or in the form of fibers, the dimensions of the particles being in the range 1 to 100 microns.

One may introduce into the catalytic mass other substances, such as a salt of an alkaline metal, for example, potassium chloride, and substances having a promotive activity, particularly compositions of copper or manganese, or metals of the rare earths, as well as these metals in metallic form.

When these catalytic masses are employed either by the fixed-bed technique or by the fluidation technique, it is particularly advantageous to choose support materials in the form of fibers; this results in great porosity of the catalytic mass. When one uses the catalytic masses of this invention in a fluidized bed, it is preferable to choose the support material in granular form, which, added to their internal porosity, presents the advantage of having a mass of low specific gravity, thus permitting the use of reduced ascending gas velocities in the fluidized bed.

It has been observed that the catalytic masses according to this invention have small tendency to clump.

Furthermore, these catalytic masses have strong mechanical resistance under the conditions of use and can be used without deterioration for a great number of cycles.

The following examples illustrate preferred embodiments of this invention but they are intended to be illustrative only and not to limit the scope of this invention, which is defined in the appended claims.

Example 1

This example discloses a catalytic mass applicable in the preparation of ammonia and of chlorine from ammonium-chloride.

In a 2-liter flask provided with an agitator, an air inlet and a reflux condenser, are introduced 1500 ml. water at 75° C., 100 g. of metallic iron, and 40 g. of ferrous sulfate heptahydrate. 80 g. alumina calcined at 950° C. and having a particle size such that it is retained between sieves having openings, respectively, of 40 and 75 microns is added to the flask and, while the temperature is maintained at 75° C.±2° C., air is passed through the suspension at the rate of 15 liters per hr. for 48 hours. The resulting suspension is filtered and the residue calcined at 550° C. yielding 130 g. of a solid containing 38.4% $Fe_2O_3$. 30 g. potassium chloride is then mixed with 120 g. of the calcined product and the resulting mixture is activated and partially reduced in an electrically heated, vertical glass tube at 550° C. in a current of illuminating gas at the rate of 8 liters per hr. for about 60 hours. The resulting mass is then ready for use.

Example 2

This example discloses a method of preparation of a catalytic mass applicable in the production of ammonia and chlorine from ammonium chloride.

The operation is carried out in the same conditions as described in Example 1 except that the alumina is replaced by 40 g. of silica gel, the major part of the particles of which is retained between sieves having openings, respectively, of 50 and 100 microns. In this way 72 g. is obtained of a composition containing 44.4% $Fe_2O_3$, which is combined in the same manner as in Example 1, with 18 g. of potassium chloride. The catalytic mixture is then activated as described in Example 1.

Example 3

This example discloses a preparation according to this invention of a catalytic mass constituted essentially of iron oxide deposited on cupric oxide and applicable in the preparation of ammonia and chlorine from ammonium chloride. The method is carried out under the same conditions as described in Example 1 except that the alumina is replaced by cupric oxide, the particles of which are retained between sieves having, respectively, openings of 20 and 80 microns. After calcination at 700° C., a compound is obtained containing 76.65% $Fe_2O_3$ and 23.35% CuO. 45 g. of this composition is mixed with 45 g. of alumina in the form of corundum, the majority of the particles of which is retained between sieves having openings, respectively, of 20 and 80 microns and 9 g. of potassium chloride. The catalytic mass is then activated as described in Example 1.

Example 4

This example discloses a method of preparation, according to the invention, of a catalytic mass applicable in the synthesis of ammonia from hydrogen and nitrogen. In an 8-liter flask provided with an agitator, an air inlet and a reflux condenser, are introduced 6 liters water at 75° C., 400 g. metallic iron, and 250 g. of corundum, the major part of the particles of which are retained between two sieves having openings, respectively, of 40 and 90 microns. The temperature being maintained at 75° C., 250 g. of ferrous sulfate heptahydrate is introduced and air is passed through the liquid at the rate of 35 liters per hr. for 90 hours.

After filtration and calcination of the residue at 600° C., 750 g. of a composition is obtained containing 66.6% $Fe_2O_3$; this is compressed into 6 mm. tablets. These tablets are then treated in a current of hydrogen at 500° C. so as to reduce the ferric oxide to metallic iron. The catalytic mass is then ready for use.

Example 5

This example concerns or discloses the preparation of a catalytic mass applicable in the preparation of ammonia and chlorine from ammonium chloride. In a 2-liter flask containing 1,000 ml. water at 70–75° C. is introduced 100 g. asbestos in the form of a powder which is dispersed in the liquid by rapid agitation. 100 g. metallic iron and 60 g. ferrous sulfate heptahydrate are then introduced into the suspension and the agitation is continued while air is blown into the liquid at the rate of 10 to 12-liters per hr. After 70 hrs. one obtains a light yellow substance which is filtered, washed, and calcined at 650° C. for 15 minutes. The yield is 183 g. of a mass containing 47% of $Fe_2O_3$ and having an apparent density of 0.40 g./cm.³. 19 g. of potassium chloride and 9 g. manganese oxide $Mn_3O_4$ are incorporated in the calcined mass and the mixture partially reduced by a current of illuminating gas at 500–520° C. The product is used in a fixed bed with 24 g. of ammonium chloride. One realizes in this way the release of ammonia in a period shortened 30% in comparison with that which is observed with an analogous catalytic mass but having a silica support. The yields of ammonia and chlorine are, respectively, 98.35 and 98%.

Example 6

The operation is carried out as in Example 3 but with 30 g. fibrous asbestos of which the elementary fibers have an average length of 5 to 15 microns and a diameter of 2 to 3 microns. After 48 hours of operation, filtration, washing, and calcination at 650° C., a yield of 104 g. is obtained of a substance containing 70% $Fe_2O_3$. As in the preceding example, this substance is mixed with 16.5 g. potassium chloride and 7 g. manganese oxide $Mn_3O_4$ before being put in operation in a fixed bed with 20 g. ammonium chloride. A rapid evolution of ammonia is obtained with a yield of 98.7%. The chlorine obtained contains only .20% hydrochloric acid. In the course of this experiment 86% of the ferrous oxide present in the catalytic mass has been transformed to ferrous chloride without any evidence of clumping of the catalytic mass.

As many apparently widely different embodiments of the present invention may be made without departing from the spirit and scope thereof, it is to be understood that the invention is not limited to the specific embodiments.

What is claimed is:

1. The method of forming an iron-base catalytic mass which comprises forming an aqueous suspension containing a particulate supporting material and an iron-base substance selected from the class consisting of metallic iron and a hydrolyzable iron salt, heating the suspension under reflux while blowing a current of air through it, whereby an iron compound is deposited on the supporting material, separating the resulting insoluble material by filtration, calcining the insoluble residue, and subjecting the calcined residue to reducing and activating condition in a current of a reducing gas at an elevated temperature.

2. The method defined in claim 1 in which the major part of the particulate supporting material has particle diameters in the range 1–100 microns, the aqueous suspension is maintained at a temperature of about 75° C. during the air blowing step, the calcination and reduction are each carried out at a temperature in the range of about 500° C.–700° C., and the reducing gas is illuminating gas.

3. The method defined in claim 1 in which the particulate supporting material is selected from the class consisting of calcined alumina, silica gel, cupric oxide, asbestos, vermiculite, biotite, hydrobiotite and mixtures thereof.

4. The method defined in claim 1 in which the ratio by weight of iron, calculated as $Fe_2O_3$, to supporting material is in the range 0.5–2.

5. In combination with the method defined in claim 1 the further step of adding to the calcined insoluble residue before activation and reduction a compound selected from the group consisting of alkali metal chlorides and mixtures thereof.

6. In combination with the method defined in claim 1 the further step of adding inert solid diluent to the calcined insoluble residue before activation and reduction.

7. The method defined in claim 3 in which the particulate supporting material is asbestos having particle dimensions in the range 1–100 microns.

8. The method of forming an iron-base catalytic mass which comprises operating by the following steps on the following materials in the indicated ratios: forming a suspension in 1500 ml. water at 75° C. of 100 g. metallic iron, 40 g. ferrous sulfate heptahydrate and 80 g. alumina calcined at 950° C., said alumina consisting of particles the major portion of which have dimensions in the range 40–75 microns, then, while agitating the suspension and maintaining it at 75°±2° C. under refluxing conditions, passing a current of air through it at the rate of 15 liters per hr. for 48 hours, filtering off the insoluble residue and calcining the insoluble residue at 550° C., whereby a solid is obtained containing approximately 38 percent iron calculated as $Fe_2O_3$, mixing with the calcined residue potassium chloride in the ratio of 30 g. KCl to 120 g. residue, and activating and partially reducing the resulting mixture by heating it at a temperature of 550° C. for approximately 40 minutes in a current of illuminating gas introduced at the rate of 8 liters per hour.

9. The method of forming an iron-base catalytic mass by the steps defined in claim 8 but in which 40 g. silica gel replaces the 80 g. alumina, the major portion of the particles of said silica gel having dimensions in the range 50–100 microns, and in which potassium chloride is mixed with the calcined residue in the ratio 18 g. KCl to 72 g. residue.

10. The method of forming an iron-base catalytic mass by the steps defined in claim 8 but in which cupric oxide replaces the alumina, the major portion of the particles of said cupric oxide having dimensions in the range 20–80 microns, the insoluble residue from the air-blowing step is calcined at 700° C., and corundum instead of potassium chloride is added to the calcined residue in the ratio of 45 g. corundum to 45 g. residue, the major portion of the particles of corundum having dimensions in the range of 20–80 microns.

11. The method of forming an iron-base catalytic mass which comprises operating by the following steps on the following materials in the indicated ratios: forming a suspension in 6 liters water at 75° C. of 400 g. metallic iron and 200 g. corundum, the major portion of said corundum consisting of particles with dimensions in the range 40–90 microns, and 250 g. ferrous sulfate heptahydrate, then while agitating the suspension and maintaining its temperature at 75° C. passing a current of air through it for 90 hours at the rate of 35 liters per hour, filtering off the insoluble residue and calcining the insoluble residue at 600° C. whereby a solid is obtained containing approximately 66.6% iron calculated as $Fe_2O_3$, compressing this solid into tablet form and reducing the iron content thereof to metallic iron by a current of hydrogen at 500° C.

12. The method of forming an iron-base catalyst mass for the manufacture of ammonia and chlorine from ammonium chloride which comprises precipitating one of a group consisting of ferric oxide, ferric hydroxide, and ferric chloride on inert support particles from the class of silica, alumina, copper oxide, and silico-aluminates which are suspended in aqueous medium containing a dissolved salt of iron, by reacting the dissolved salt in the aqueous medium with one of a group of agents of oxidation, double decomposition, neutralization and hydrolysis, and isolating and dehydrating the catalyst mass.

13. A method of making a composition of matter adapted to the catalytic preparation of ammonia which comprises precipitating one of the class of iron oxide, iron hydroxide, and iron oxychloride by ionic reaction of gaseous oxygen on a readily hydrolyzable, water soluble iron compound from aqueous solution containing additional iron onto a support of inert particles suspended in the aqueous solution, filtering off the precipitate, calcining it, and partly reducing it.

14. A method of preparing a catalytic composition of matter which comprises precipitating ferric oxide from aqueous ferrous salt solution onto suspended particles of support material by ionic reaction in the presence of additional iron, the additional iron being metallic, and the ionic reactant being gaseous oxygen, filtering and calcining the mass, and partly reducing it.

15. An anhydrous composition of matter suitable as a catalyst for the preparation of ammonia and chlorine from ammonium chloride which consists in its essential constituents of particles of carrier, from the class of silica, alumina, cupric oxide, and silico-aluminates, bearing and united to partly reduced iron oxide, the weight of iron expressed as $Fe_2O_3$ to the weight of the carrier in the composition lying between about .5 and 2, and of an alkali metal salt and one of the copper halides and oxides.

16. A composition according to claim 15 in which the carrier is silica.

17. A composition according to claim 15 in which the carrier is alumina.

18. A composition according to claim 15 in which the carrier is a metallic silico-aluminate.

19. A composition according to claim 15 in which the carrier is at least one of the group asbestos, vermiculite, biotite, and hydrobiotite.

20. A composition according to claim 15 in which the carrier is asbestos.

21. A composition according to claim 15 which also contains a catalyst activator from the class consisting of Ni, K, Co and Al salts and the rare earth metals.

22. An anhydrous catalytic mass consisting essentially of felted fibers of asbestos bonded to partly reduced iron oxide.

23. An anhydrous catalytic mass consisting essentially of one of the group consisting of the silico-aluminates bonded to a partly reduced iron oxide.

24. The method of claim 12 in which the dehydration involves the calcination and reduction of the product.

References Cited

UNITED STATES PATENTS

| | | | |
|---|---|---|---|
| 1,068,966 | 7/1913 | Bosch et al. | 23—199 |
| 1,489,497 | 4/1924 | Larson | 252—466 |
| 1,510,598 | 10/1924 | Larson | 252—474 |
| 1,618,004 | 2/1927 | Greathouse | 252—466 |
| 3,243,386 | 3/1966 | Nielsen et al. | 252—466 |

FOREIGN PATENTS

| | | |
|---|---|---|
| 164,734 | 8/1955 | Australia. |
| 1,142,849 | 1/1963 | Germany. |

DANIEL E. WYMAN, *Primary Examiner.*

C. F. DEES, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,099                October 1, 1968

Andre Steinmetz

It is certified that error appears in the above identified patent and that said Letters Patent are hereby corrected as shown below:

In the heading to the printed specification, line 9, after "962,728" insert -- ; Nov. 26, 1964, 996,414 --.

Signed and sealed this 24th day of February 1970.

(SEAL)
Attest:

Edward M. Fletcher, Jr.
Attesting Officer

WILLIAM E. SCHUYLER, JR.
Commissioner of Patents